United States Patent
Han et al.

(10) Patent No.: US 9,953,441 B2
(45) Date of Patent: Apr. 24, 2018

(54) PROCESSING METAL ARTIFACT IN CT IMAGE

(71) Applicant: SHENYANG NEUSOFT MEDICAL SYSTEMS CO., LTD., Shenyang (CN)

(72) Inventors: Junlong Han, Shenyang (CN); Ling Pang, Shenyang (CN); Shanshan Lou, Shenyang (CN)

(73) Assignee: Shenyang Neusoft Medical Systems Co., Ltd., Shenyang (CN)

( * ) Notice: Subject to any disclaimer, the term of this patent is extended or adjusted under 35 U.S.C. 154(b) by 134 days.

(21) Appl. No.: 14/959,486

(22) Filed: Dec. 4, 2015

(65) Prior Publication Data

US 2016/0163071 A1 Jun. 9, 2016

(30) Foreign Application Priority Data

Dec. 4, 2014 (CN) .......................... 2014 1 0741819

(51) Int. Cl.
  *G06K 9/00* (2006.01)
  *G06T 11/00* (2006.01)
(52) U.S. Cl.
  CPC .................................. *G06T 11/008* (2013.01)
(58) Field of Classification Search
  CPC ......... G06T 11/008; G06T 2207/10081; G06T 2211/40
  USPC ....................................................... 382/131
  See application file for complete search history.

(56) References Cited

U.S. PATENT DOCUMENTS

| 8,233,586 B1* | 7/2012 | Boas ....................... G06T 5/002 378/207 |
| 2011/0007956 A1* | 1/2011 | Meyer .................... A61B 6/032 382/131 |
| 2013/0070991 A1* | 3/2013 | Yang ..................... G06T 11/008 382/131 |
| 2014/0056497 A1* | 2/2014 | Hsieh ..................... G06T 5/005 382/131 |
| 2015/0146955 A1* | 5/2015 | Dong .................... G06T 11/006 382/131 |

FOREIGN PATENT DOCUMENTS

| CN | 103106675 A | 5/2013 |
| WO | 2013129811 A1 | 9/2013 |

* cited by examiner

*Primary Examiner* — Van D Huynh
(74) *Attorney, Agent, or Firm* — McCoy Russell LLP

(57) ABSTRACT

A method for processing metal artifacts in a CT image is provided. The method may comprise: performing a first metal artifact processing on the original image to obtain a first processed image COR1 and extracting the high frequency portion of the first processed image COR1 to obtain a first high-frequency image COR1HF; performing a second metal artifact processing on the original image to obtain a second processed image COR2 and extracting the high frequency portion of the processed image COR2 second to obtain a second high-frequency image COR2HF; perform a weighted combination the first processed image COR1, the first high-frequency image COR1HF and the second high-frequency image COR2HF by using a weighting function W to obtain a result image CORImp containing no metal artifact, but information of area near the metal artifact.

12 Claims, 5 Drawing Sheets

PROCESSING METAL ARTIFACT IN CT IMAGE

CROSS-REFERENCE TO RELATED APPLICATIONS

The present application claims priority to Chinese Patent Application No. 201410741819.3, filed on Dec. 4, 2014, the entire contents of which are hereby incorporated by reference for all purposes.

BACKGROUND

Computed Tomography (CT) may be used to diagnose a variety of diseases.

During CT scanning, if a subject (e.g., a patient) includes metal, then beam hardening, increased noise, increased scatter and partial volume effects may be produced. Therefore, image artifacts, e.g., metal artifacts, may be present in the reconstructed CT image. The presence of image artifacts such as metal artifacts will reduce the quality of the CT image.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, MRI, digital X-ray machines, Ultrasound, PET (Positron Emission Tomography), Linear Accelerators, and Biochemistry Analysers. Currently, NMS' products are exported to over 60 countries and regions around the globe, serving more than 5,000 renowned customers. NMS's latest successful developments, such as the 128 Multi-Slice CT Scanner System, Superconducting MRI, Linear Accelerator, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process. The present disclosure provides a method and device for processing metal artifacts in a CT image.

BRIEF DESCRIPTION OF DRAWINGS

Features of the present disclosure are illustrated by way of example and not limited in the following figures, in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Figure 1:
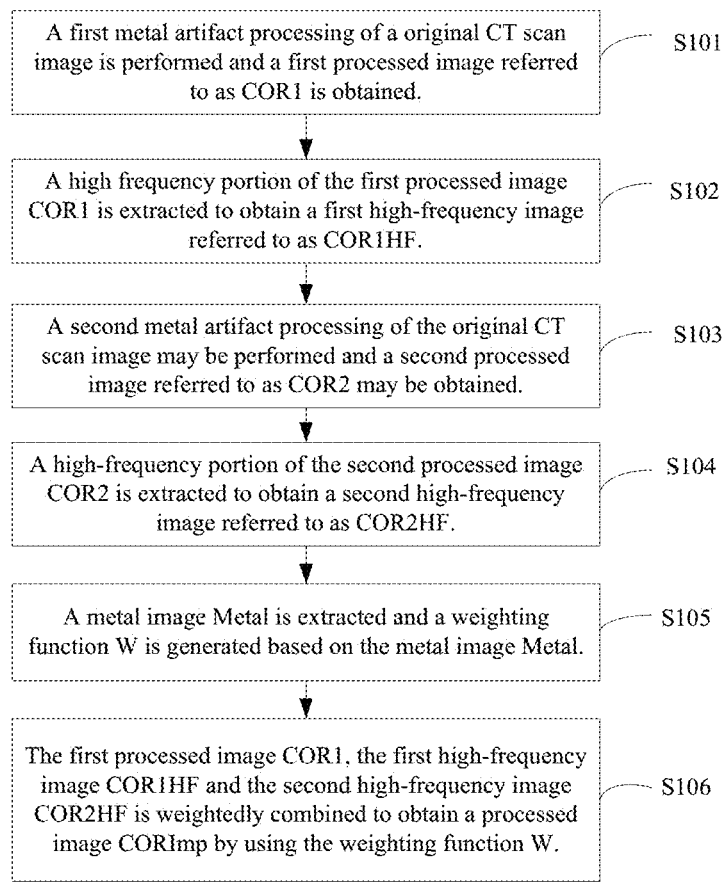
FIG. 1 is a flow chart illustrating a CT metal artifact processing method according to one example of the present disclosure.

FIG. 1 is a flow chart illustrating a CT metal artifact processing method according to one example of the present disclosure. As shown in FIG. 1, a CT metal artifact processing method may include the following blocks S101-S106.

In block S101, a first metal artifact processing of the original CT scan image may be performed and a first processed image, COR1, may be obtained.

Figure 2:
FIG. 2 is a schematic view of an original image without metal artifact processing according to one example of the present disclosure.

In block S101, an original CT scan image may be a reconstructed CT image based on scan data obtained by performing CT scanning on the subject. In a case where the subject being scanned contains metal, the original CT scan image may include radial metal artifacts as shown in FIG. 2. This may be due to X-ray-hardening, increased noise and/or increased scattering caused by the metal absorbing the ray.

A first metal artifact processing may be used for correction of the metal artifact data obtained, which may be any metal artifact correction method or combination of methods known to those skilled in the art.

As an example, a first metal artifact processing may be conducted as follows: first, an original image is reconstructed based on the scan data obtained by a CT scan, and segmented into a separate image containing only metal objects (hereinafter, referred to as "metal image"); next, an orthographic projection of the metal image is conducted to obtain a range of the scan data within which the metal objects are contained; then, the scan data in the range within which the metal objects are contained may be corrected. While the scan data outside the range remains unchanged; an image may be reconstructed again based on the corrected scan data. Finally, the metal image may be added to the reconstructed image so as to obtain the first processed image referred to as COR1.

Figure 3:
FIG. 3 is a schematic view of a first processed image formed after a first metal artifact processing according to one example of the present disclosure.

On one hand, since the range where the metal objects are contained may be determined by performing an orthographic projection on the metal image and the scan data correction may be based on the determined range, a first metal artifact processing may cause some tissue information of the subject around the metal to be lost. In general, the tissue information lost mainly includes skeletal information. For example, as shown in FIG. 3, the first processed image, COR1, loses some tissue information of the subject in the vicinity of the metal.

On the other hand, the region of the image outside the range where the metal objects are contained may be reconstructed based on the corrected scan data by the first metal artifact processing and the first processed image COR1 may be obtained by adding the metal image to the reconstructed region of the image. Therefore, the first processed image COR1 almost completely eliminates the metal artifacts.

In block S102, a high frequency portion of the first processed image COR1 may be extracted to obtain a first high-frequency image referred to as COR1HF.

For example, a first high-frequency image COR1HF may be obtained by using a high-pass filter to filter the first processed image COR1 and extract the high-frequency portion of the first processed image COR1.

It should be noted that images of metal artifacts may usually be low-frequency images, while the images of subjects may usually be high-frequency images. Therefore, a first high-frequency image COR1HF may be seen as an information image of the subject.

In addition, all frequency involved processes of the present disclosure may be conducted by transforming image data in a spatial domain into data in a frequency domain through a Fourier transform. Then, after the data in a frequency domain is processed accordingly, e.g., filtered, the processed data in a frequency domain may be restored as image data in a spatial domain by an inverse Fourier transform.

In block S103, a second metal artifact processing of the original CT scan image may be performed and a second processed image COR2 may be obtained.

Figure 4:
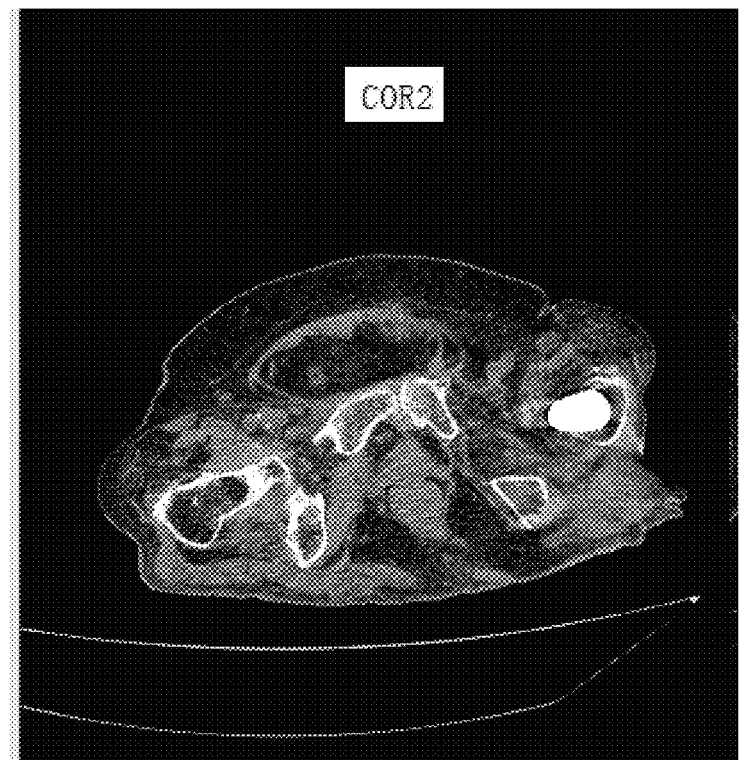
FIG. 4 is a schematic view of a second processed image formed after a second metal artifact processing according to one example of the present disclosure.

A second metal artifact processing may then be used to remove metal artifacts in an original image. Compared with a first metal artifact processing, a second metal artifact processing removes metal artifacts under the premise without affecting the tissue information of the subject. For example, a second processed image COR2 obtained through a second metal artifact processing retains information of regions near the metal of the subject. A schematic view of the second processed image COR2 of an example of the disclosure may be shown in FIG. 4.

Specifically, a first metal artifact processing and a second metal artifact processing may both be used to remove metal artifacts from the original image. However, since a first metal artifact processing corrects all metal artifact data, it may remove the metal artifacts more thoroughly. But there may be a loss of information in the regions near the metal artifact of the subject. A second metal artifact processing may only affect metal artifacts, and may preserve the information of an area near the metal artifact of the subject. However, a second metal artifact processing may not remove the metal artifacts completely. In addition, a first processed image obtained from a first metal artifact processing may be closer to the desired image which may not contain metal artifacts at all. Accordingly, first and second processed images may be combined to synthesize a result processed image with the metal artifacts removed and may retain information of regions in the vicinity of the metal. The present disclosure is based on this above idea to deal with CT images having metal artifacts.

Briefly, the main purpose of a second metal artifact processing may be to obtain information of the regions near the metal of the subject.

As described above, metal artifacts may include hardening artifacts. In such a case, a second metal artifact processing performed on an original image to obtain a second processed image COR2 may specifically include:

Applying a hardening correction to an original image to reduce hardening artifacts in an original image and thus to obtain a second processed image COR2.

In addition, metal artifacts may include strip artifacts other than hardening artifacts. In such a case, a second metal artifact processing performed on an original image to obtain a second processed image COR2 may specifically include:

A: pre-processing the scan data corresponding to an original image to reduce strip artifacts in the original image and thus, to obtain an Ori-Air image; where the pre-processing may be a raw data iterative method or an adaptive filtering method, which generally may not affect tissue information of the subject being scanned;

B: applying a hardening correction to the Ori-Air image to reduce the hardening artifacts in an Ori-Air image and thus to obtain a second processed image COR2.

As an example of the present disclosure, the process B may be achieved through the following method:

B1a: a smoothing filter may be applied to an Ori-Air image to obtain an Ori-Air-Smo image;

B1b: a smoothing filter may be applied to a first processed image COR1 to obtain a COR1-Smo image;

B2: the difference between an Ori-Air-Smo image and a COR1-Smo image may be calculated so as to obtain a HardenArti image containing hardening artifacts;

B3: the difference between an Ori-Air image and a HardenArti image containing hardening artifacts may be calculated to obtain a second processed image COR2.

Among the above processes, since the main processing may be the comparison between the Ori-Air image and the COR1-Smo image, and what may be extracted is a low-frequency difference image, the above hardening correction process usually may not affect the tissue information of the subject.

In block S104, a high-frequency portion of a second processed image COR2 may be extracted to obtain a second high-frequency image referred to as COR2HF.

For example, a second processed image COR2 may be filtered by using a high-pass filter and the high-frequency portion of a second processed image COR2 may be extracted to obtain a second high-frequency image COR2HF.

Note that similar to a first high-frequency image COR1HF extracted from a first processed image COR1, a second high-frequency image COR2HF extracted from a second image COR2 may also be regarded as an information image of the subject.

In block S105, a metal image Metal may be extracted and a weighting function, W, may be generated based on the metal image Metal.

Figure 5:
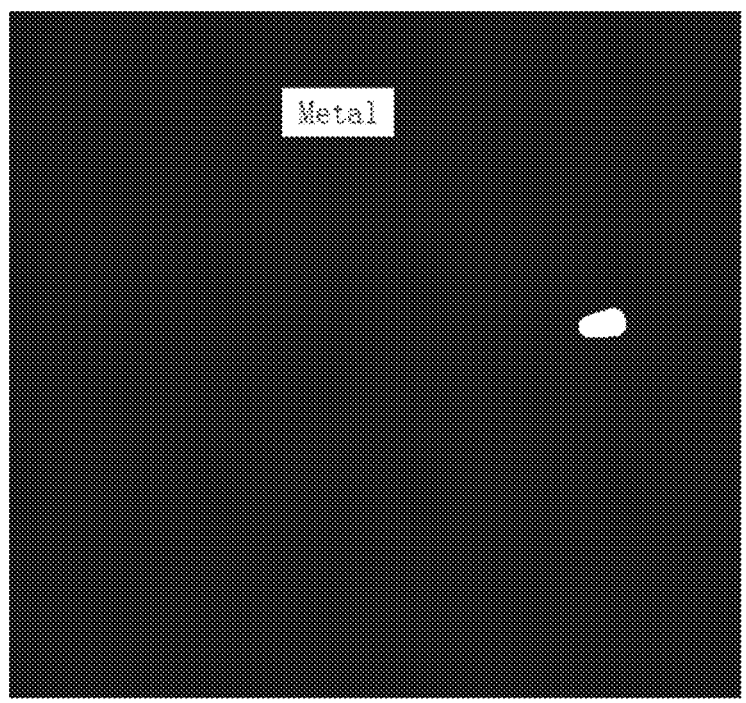
FIG. 5 is a schematic image of a metal object according to one example of the present disclosure.

Specifically, a CT image containing metal image may be segmented based on a pre-set threshold and pixels with CT values above the pre-set threshold may be extracted to form the metal image. Pixels with CT values above the pre-set threshold may be defined as metal points. Pixels with CT values below the pre-set threshold may be defined as non-metal points. The metal image Metal consists of metal points. Such a metal image of an example of the disclosure is shown in FIG. 5. In the present disclosure, a CT image containing metal image may be the original image to be processed, a first processed image COR1 or a second processed image COR2.

Further, a weighting function W may be generated based on the metal image. A specific method of generating the weight function W may be the following: the metal image may be low-pass filtered to obtain a low-frequency metal image; the low-frequency image may then be normalized to generate the weighting function W.

According to an example, the above-mentioned normalization of the low-frequency metal image may be performed according to a pixel with the maximum CT value of a low-frequency metal image. Specifically, the maximum CT value of a low-frequency metal image is firstly determined. Then, the CT values of all the pixels of a low-frequency metal image are divided by the maximum CT value to obtain a weighting function W.

Figure 6:
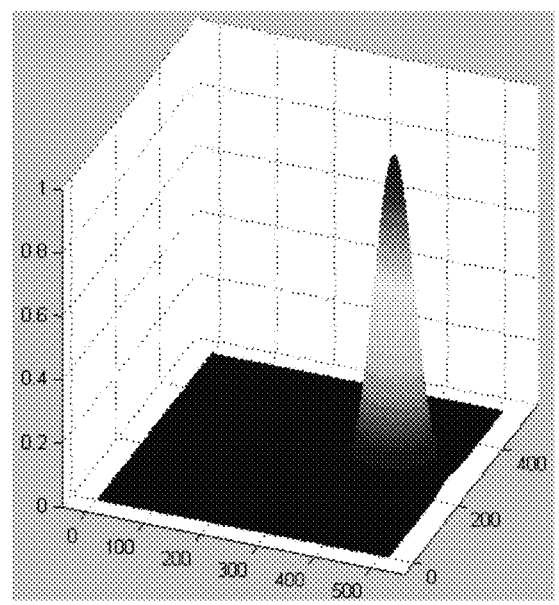
FIG. 6 is a schematic diagram of a weighting function obtained based on a metal object image according to one example of the present disclosure.

Accordingly, as shown in FIG. 6, the weighting function W may have characteristics including that the weight may be relatively high in a metal area or a nearby area and relatively low in other areas. For example, as the distance to a metal increases, the weight may become smaller and smaller.

In block S106, a first processed image COR1, a first high-frequency image COR1HF and a second high-frequency image COR2HF may be combined based on their weights to obtain a processed image CORImp by using the weighting function W described above.

Specifically, a weighted combination may be performed according to the following equation: CORImp=COR1+(COR2HF−COR1HF)*W.

Since a second high-frequency image COR2HF may not contain any metal artifact, but may contain information of regions near the metal, and a first high-frequency image COR1HF may contain neither metal artifact nor information of regions near the metal. The difference of the two images (COR2HF−COR1HF) may be the information of the regions near the metal. Accordingly, the product of the information of the regions near the metal and the weighting function W, (COR2HF−COR1HF)*W, may be the location distribution of the information of the regions near a metal in the CT image.

A product of the information of regions near a metal and a weighting function, (COR2HF−COR1HF)*W, may be added to a first processed image COR1 to obtain the image COR1+(COR2HF−COR1HF)*W, i.e., the processed image CORImp.

Although the first processed image COR1 may not contain any information of the regions near a metal, other information of the first processed image COR1 approximates well to the actual tomographic image. Thus, adding a first processed image COR1 to a product of the information of the regions near a metal and a weighting function, (COR2HF−COR1HF)*W, to obtain a processed image CORImp (COR1+(COR2HF−COR1HF)*W) not only removes the metal artifacts, but may also retain the information of the regions near a metal, thus improving the quality of the resulting image.

Further, it is noted that a CT metal artifact processing method provided by the present disclosure may not be limited to the above-described execution order. For example, a processing method may perform a second metal artifact processing first and then perform a first metal artifact processing. Of course, if the second metal artifact processing utilizes a first processed image, then the method may perform a first metal artifact processing first and then perform a second metal artifact processing.

Figure 7:
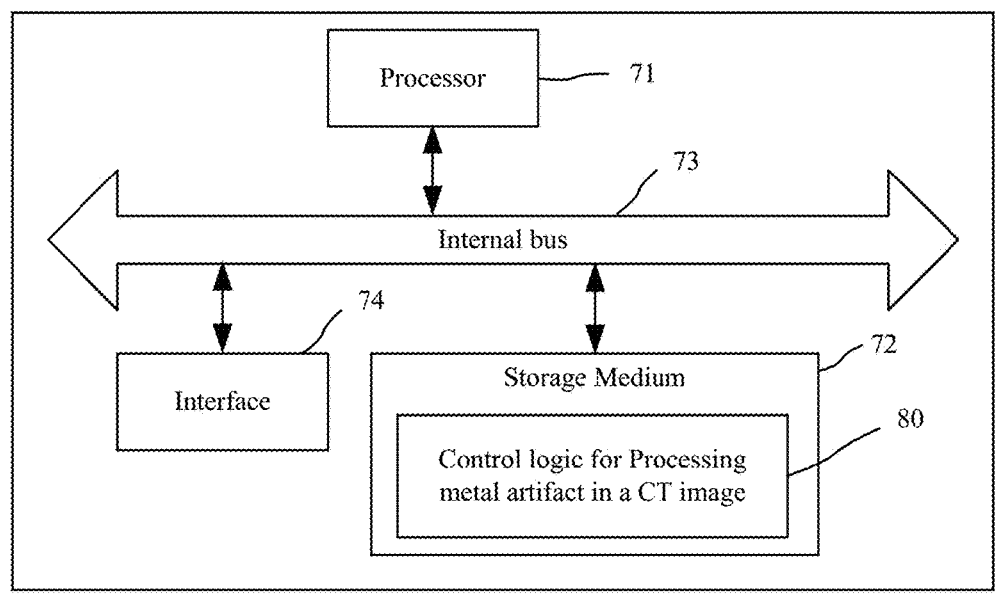
FIG. 7 is a block diagram illustrating a hardware structure of a CT metal artifact processing apparatus according to another example of the present disclosure.

Examples of the present disclosure further provide an apparatus for processing CT metal artifacts. Shown in FIG. 7, the apparatus includes a processor 71, machine-readable storage medium 72, where the processor 71 and the machine-readable storage medium 72 are typically connected to each other via an internal bus 73. In any other possible implementations, the apparatus may also include an interface 74 so that the apparatus may communicate with other external devices.

In a different example, a machine-readable storage medium 72 may be RAM (Random Access Memory), volatile memory, non-volatile memory, flash memory, storage drives (such as hard drives), solid state hard disk, any type of storage disk (such as CD-ROM, DVD, etc.), or similar storage medium, or a combination thereof.

Figure 8:
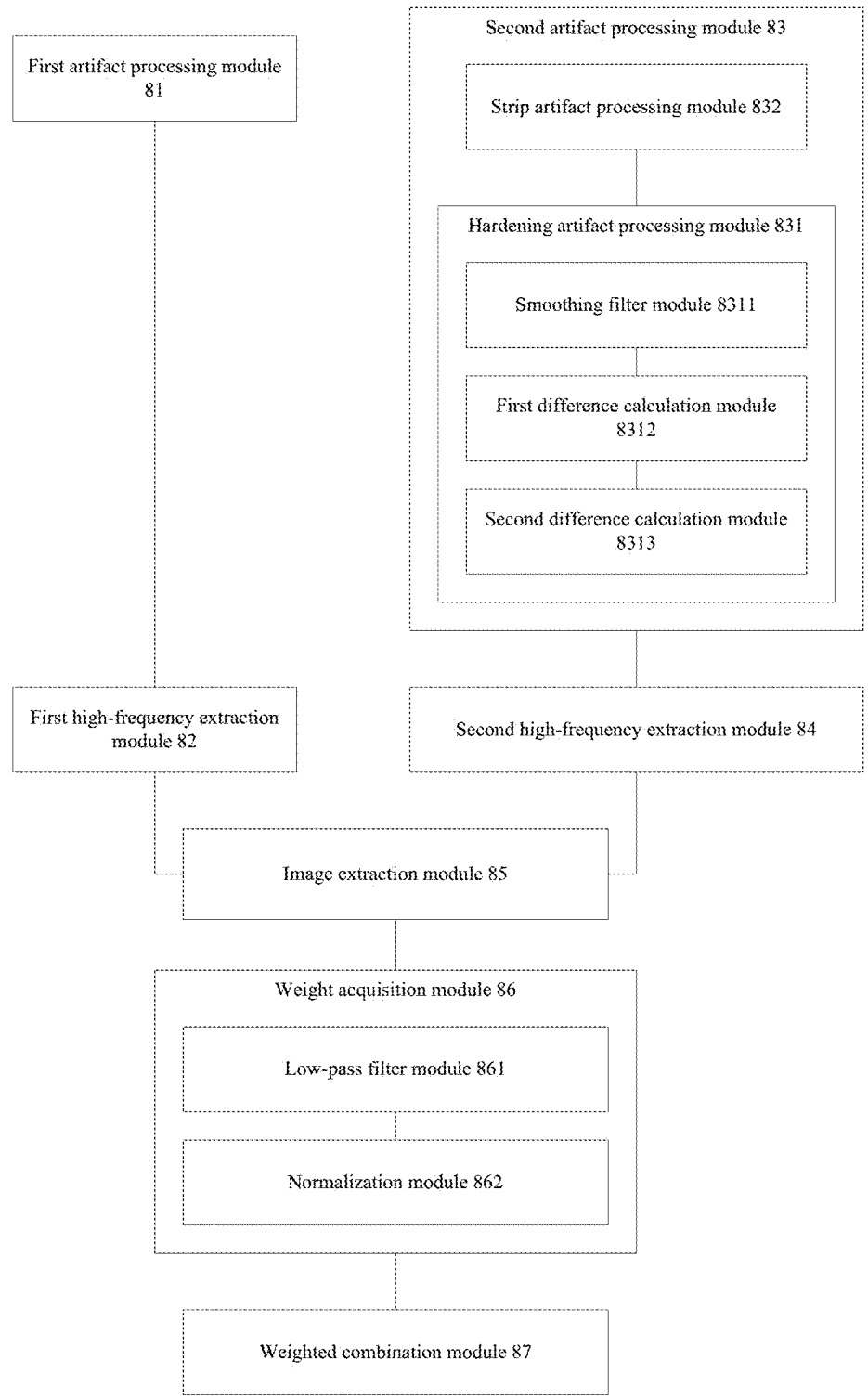
FIG. 8 is a block diagram illustrating function blocks of control logic corresponding to a CT metal artifact processing method provided in FIG. 1 according to one example of the present disclosure.

Further, the machine-readable storage medium 72 may store control logic 80 for controlling the CT metal artifact processing. From a perspective of functional division, as shown in FIG. 8, the control logic 80 may include a first artifact processing module 81, a first high-frequency extraction module 82, a second artifact processing module 83, a second high-frequency extraction module 84, an image extraction module 85, a weight acquisition module 86 and a weighted combination module 87.

A first artifact processing module 81 may perform the first metal artifact processing on an original image to obtain a first processed image COR1, where an original image includes metal artifacts and a first metal artifact processing may be used to remove metal artifacts.

A first high-frequency extraction module 82 extracts the high frequency portion of a first processed image COR1 to obtain a first high-frequency image COR1HF.

A second artifact processing module 83 may perform a second metal artifact processing on the original image to obtain a second processed image COR2, where a second metal artifact processing is used to remove the metal artifacts of an original image, but to retain the information of the regions in the vicinity of the metal of a subject.

A second high-frequency extraction module 84 may extract the high frequency portion of a second processed image COR2 to obtain a second high-frequency image COR2HF.

An image extraction module 85 extracts metal image.

A weight acquisition module 86 generates a weighting function W according to a metal image.

A weighted combination module 87 may perform a weighted combination of a first processed image COR1 and the first and second high-frequency images COR1HF, COR2HF, by using a weighting function W, to obtain a processed image CORImp. Specifically, a weighted combination may be performed according to the following equation:

$$CORImp=COR1+(COR2HF-COR1HF)*W.$$

Further, metal artifacts may include strip artifacts and/or hardening artifacts. So a second artifact processing module 83 may be used to remove both strip artifacts and hardening artifacts. Thus, according to an example, a second artifact processing module 83 may specifically include:

A hardening artifact processing module 831 for performing hardening correction on an original image to reduce the hardening artifacts of the original image or data.

According to another example, a second artifact processing module 83 may also include:

A strip artifact processing module 832 for performing a pre-processing on the scan data corresponding to an original image to reduce strip artifacts of the original image and to obtain an Ori-Air image.

In such a case, a hardening artifact processing module 831 may also be used to perform a hardening correction on the Ori-Air image to reduce the hardening artifacts in the Ori-Air image. For example, a hardening artifact processing module 831 may include:

A smoothing filter module 8311 for applying smoothing filter to the Ori-Air image to obtain an Ori-Air-Smo image, and to a first processed image COR1 to obtain a COR1-Smo image;

A first difference calculation module 8312 for calculating the difference between an Ori-Air-Smo image and a COR1-Smo image to obtain a HardenArti image containing hardening artifacts;

A second difference calculation module 8313 for calculating the difference between an Ori-Air image and the HardenArti image to obtain a second processed image COR2.

Further, in accordance with an example of the present disclosure, a weight acquisition module 86 may specifically include:

A low-pass filter module 861 for applying low-pass filtering to the metal image to obtain a low-frequency metal image;

A normalization module 862 for normalizing the low-frequency metal image to generate a weighting function W.

Below is an example to further describe how an apparatus for processing CT metal artifacts operates a control logic 80. In this example, a control logic 80 should be regarded as computer instructions stored in a machine-readable storage medium 72. When a processor 71 of the apparatus executes a control logic 80, the processor 71 may perform the following operations by calling the corresponding function modules of a control logic 80 stored on a machine-readable storage medium 72:

Performing a first metal artifact processing on an original image to obtain a first processed image COR1, wherein an original image may be a reconstructed CT image based on scan data obtained by CT scanning a subject, and wherein an original image contains metal artifacts, and in the process of the first metal artifact processing the scan data involving the metal artifacts may be corrected;

Extracting the high frequency portion of a first processed image COR1 to obtain a first high-frequency image COR1HF;

Performing a second metal artifact processing on the original image to obtain a second processed image COR2, wherein in a second metal artifact processing, metal artifacts may be removed without affecting the tissue information of the subject;

Extracting a high frequency portion of the processed image COR2 second to obtain a second high-frequency image COR2HF;

Extracting a metal image Metal from an original image and obtaining a weighting function W based on the metal image; and Performing a weighted combination of a first processed image COR1, a first high-frequency image COR1HF and a second high-frequency image COR2HF by using a weighting function W to obtain a result image CORImp.

According to one example, a weighted combination may be performed according to the following equation: CORImp=COR1+(COR2HF−COR1HF)*W.

According to an example, under the condition that metal artifacts include hardening artifacts, the instructions may cause the processor to perform a second metal artifact processing specifically comprising the following:

Applying a hardening correction to an original image to reduce the hardening artifacts in the original image and to obtain a second processed image COR2.

Further, the instructions may cause the processor to perform the hardening correction specifically comprising the following:

Smoothing filtering an original image to obtain an Ori-Smo image;

Smoothing filtering a first processed image COR1 to obtain a COR1-Smo image;

Calculating the difference between a Ori-Smo image and a COR1-Smo image to obtain a HardenArti image containing hardening artifacts; and Calculating the difference between the original image and the HardenArti image to obtain a second processed image COR2.

According to an example, under the condition where metal artifacts may include both strip artifacts and hardening artifacts, the instructions may cause the processor to perform a second metal artifact processing specifically comprising the following:

Pre-processing scan data corresponding to an original image to reduce the strip artifacts in the original image and to obtain an Ori-Air image; and Applying hardening correction to an Ori-Air image to reduce the hardening artifacts in the Ori-Air image and to obtain a second processed image COR2.

Further, the instructions may cause the processor to perform the hardening correction specifically comprising the following:

Smoothing filtering an Ori-Air image to obtain an Ori-Air-Smo image;

Smoothing filtering a first processed image COR1 to obtain a COR1-Smo image;

Calculating the difference between an Ori-Air-Smo image and a COR1-Smo image to obtain a HardenArti image containing only hardening artifacts; and Calculating the difference between an Ori-Air image and a HardenArti image to obtain a second processed image COR2.

Further, the instructions, potentially causing a processor to obtain a weighting function W based on the metal image Metal may specifically cause a processor to execute the following operations:

Applying low-pass filtering to the metal image Metal to obtain a low-frequency metal image; and Normalizing a low-frequency metal image to obtain a weighting function W.

The above are only preferred examples of the present disclosure and are not intended to limit the disclosure within the spirit and principles of the present subject matter, any changes made, equivalent replacement, or improvement in the protection of the present disclosure should be contained within the range.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product may be stored in a storage medium and may comprise a plurality of instructions for making a processor implement the methods recited in the examples of the present disclosure.

The figures provided are only illustrations of an example, wherein the units or procedure shown in the figures are not necessarily essential for implementing the present disclosure. Those skilled in the art will understand that the units in the device in the example may be arranged in the device in the examples as described, or may be alternatively located in one or more devices different from that of the examples. The units in the examples described may be combined into one module or further divided into a plurality of sub-units.

Although the flowcharts described may show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for processing metal artifacts in a Computed Tomography (CT) image, the method comprising:
   extracting a metal image from an original image;
   performing a first metal artifact processing on the original image to obtain a first processed image COR1, wherein the original image is a reconstructed CT image based on scan data obtained by CT scanning a subject, and wherein the original image contains metal artifacts, and in the process of the first metal artifact processing, the scan data involving the metal artifacts is corrected based on a metal range in which a metal object is contained, wherein the metal range is determined by performing an orthographic projection on the metal image extracted from the original image;
   extracting the high frequency portion of the first processed image COR1 to obtain a first high-frequency image COR1HF;
   performing a second metal artifact processing on the original image to obtain a second processed image COR2, wherein in the second metal artifact processing, the metal artifacts are removed without affecting the tissue information of the subject;
   extracting the high frequency portion of the second processed image COR2 to obtain a second high-frequency image COR2HF;
   obtaining a weighting function W based on the metal image; and
   performing a weighted combination for the first processed image COR1, the first high-frequency image COR1HF and the second high-frequency image COR2HF by using the weighting function W to obtain a result image CORImp;
   wherein the weighted combination is performed according to the following equation: CORImp=COR1+(COR2HF−COR1HF)*W.

2. The method of claim 1, wherein the metal artifacts include hardening artifacts and the second metal artifact processing comprises:
   applying a hardening correction to the original image to reduce the hardening artifacts in the original image and to obtain the second processed image COR2.

3. The method of claim 2, wherein the hardening correction comprises:
   smoothing filtering the original image to obtain an Ori-Smo image;
   smoothing filtering the first processed image COR1 to obtain a COR1-Smo image;
   calculating the difference between the Ori-Smo image and the COR1-Smo image to obtain an image HardenArti containing hardening artifacts; and
   calculating the difference between the original image and the image HardenArti to obtain the second processed image COR2.

4. The method of claim 1, wherein the metal artifacts include strip artifacts and hardening artifacts and the second metal artifact processing comprises:
   pre-processing scan data corresponding to the original image to reduce the strip artifacts in the original image and to obtain an Ori-Air image; and
   applying a hardening correction to the Ori-Air image to reduce the hardening artifacts in the Ori-Air image and to obtain the second processed image COR2.

5. The method of claim 4, wherein the hardening correction comprises:
   smoothing filtering the Ori-Air image to obtain an Ori-Air-Smo image;
   smoothing filtering the first processed image COR1 to obtain a COR1-Smo image;
   calculating the difference between the Ori-Air-Smo image and the COR1-Smo image to obtain an image HardenArti containing only hardening artifacts; and
   calculating the difference between the Ori-Air image and the image HardenArti to obtain the second processed image COR2.

6. The method of claim 1, wherein obtaining a weighting function W based on the metal image comprises:
   applying low-pass filtering to the metal image to obtain a low-frequency metal image; and
   normalizing the low-frequency metal image to obtain the weighting function W.

7. A device for processing metal artifacts in a Computed Tomography (CT) image, the device comprising:
   a processor which invokes machine readable instructions corresponding to a control logic for processing metal artifacts in a CT image stored on a storage medium and executes the machine readable instructions to:
   extract a metal image from an original image;
   perform a first metal artifact processing on the original image to obtain a first processed image COR1, wherein the original image is a reconstructed CT image based on scan data obtained by CT scanning a subject, and wherein the original image contains metal artifacts, and in the process of the first metal artifact processing, the scan data involving the metal artifacts is corrected based on a metal range in which a metal object is contained, wherein the metal range is determined by performing an orthographic projection on the metal image extracted from the original image;
   extract the high frequency portion of the first processed image COR1 to obtain a first high-frequency image COR1HF;
   perform a second metal artifact processing on the original image to obtain a second processed image COR2, wherein in the second metal artifact processing, the metal artifacts are removed without affecting the tissue information of the subject;
   extract the high frequency portion of the second processed image COR2 to obtain a second high-frequency image COR2HF;

obtain a weighting function W based on the metal image; and perform a weighted combination for the first processed image COR1, the first high-frequency image COR1HF and the second high-frequency image COR2HF by using the weighting function W to obtain a result image CORImp, wherein the weighted combination is performed according to the following equation: CORImp=COR1+ (COR2HF−COR1HF)*W.

8. The device according to claim 7, wherein the metal artifacts include hardening artifacts and said machine readable instructions further cause the processor to:

apply a hardening correction to the original image to reduce the hardening artifacts in the original image and to obtain the second processed image COR2.

9. The device according to claim 8, wherein said machine readable instructions further cause the processor to:

smoothing filter the original image to obtain an Ori-Smo image;

smoothing filter the first processed image COR1 to obtain a COR1-Smo image;

calculate the difference between the Ori-Smo image and the COR1-Smo image to obtain an image HardenArti containing hardening artifacts; and calculate the difference between the original image and the image HardenArti to obtain the second processed image COR2.

10. The device according to claim 7, wherein the metal artifacts include strip artifacts and hardening artifacts and said machine readable instructions further cause the processor to:

pre-process scan data corresponding to the original image to reduce the strip artifacts in the original image and to obtain an Ori-Air image; and apply a hardening correction to the Ori-Air image to reduce the hardening artifacts in the Ori-Air image and to obtain the second processed image COR2.

11. The device according to claim 10, wherein said machine readable instructions further cause the processor to:

smoothing filter the Ori-Air image to obtain an Ori-Air-Smo image;

smoothing filter the first processed image COR1 to obtain a COR1-Smo image;

calculate the difference between the Ori-Air-Smo image and the COR1-Smo image to obtain an image HardenArti containing hardening artifacts; and calculate the difference between the Ori-Air image and the image HardenArti to obtain the second processed image COR2.

12. The device according to claim 7, wherein said machine readable instructions further cause the processor to:

apply low-pass filtering to the metal image to obtain a low-frequency metal image; and normalize the low-frequency metal image to obtain the weighting function W.

* * * * *